Feb. 1, 1966  K. E. GREEN  3,232,034
FRUIT THINNING AND HARVESTING DEVICE
Filed Sept. 5, 1962  3 Sheets-Sheet 3
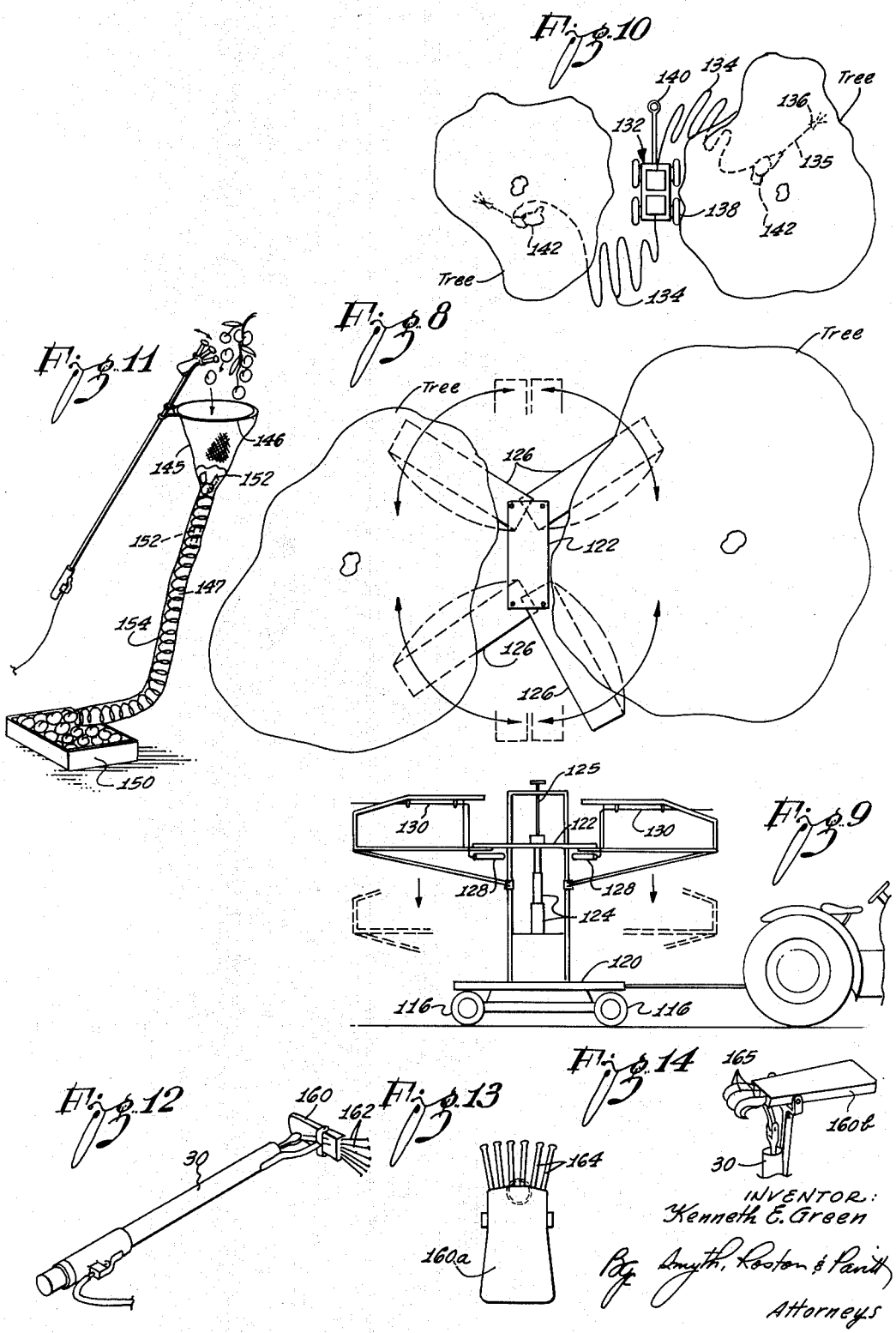

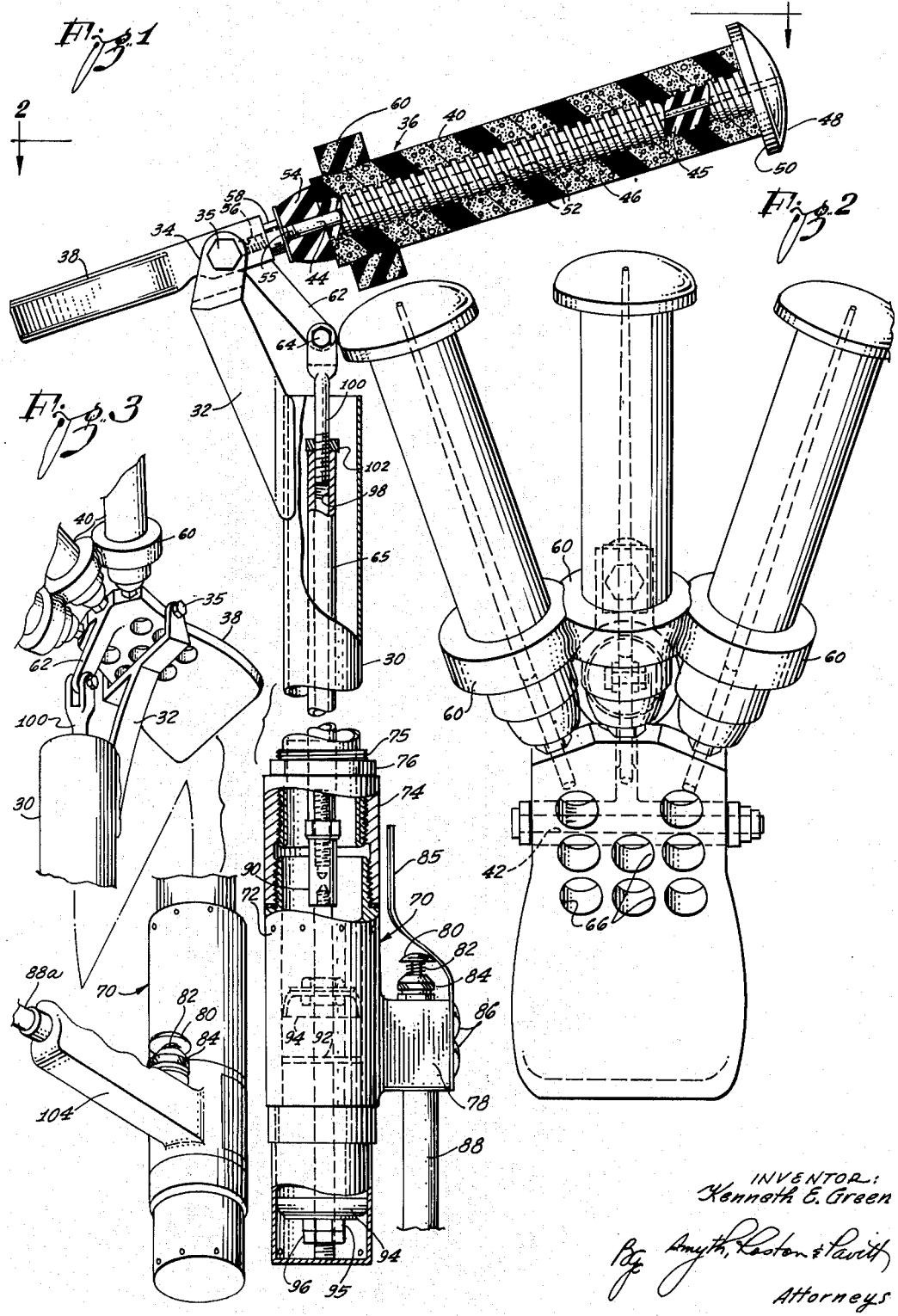

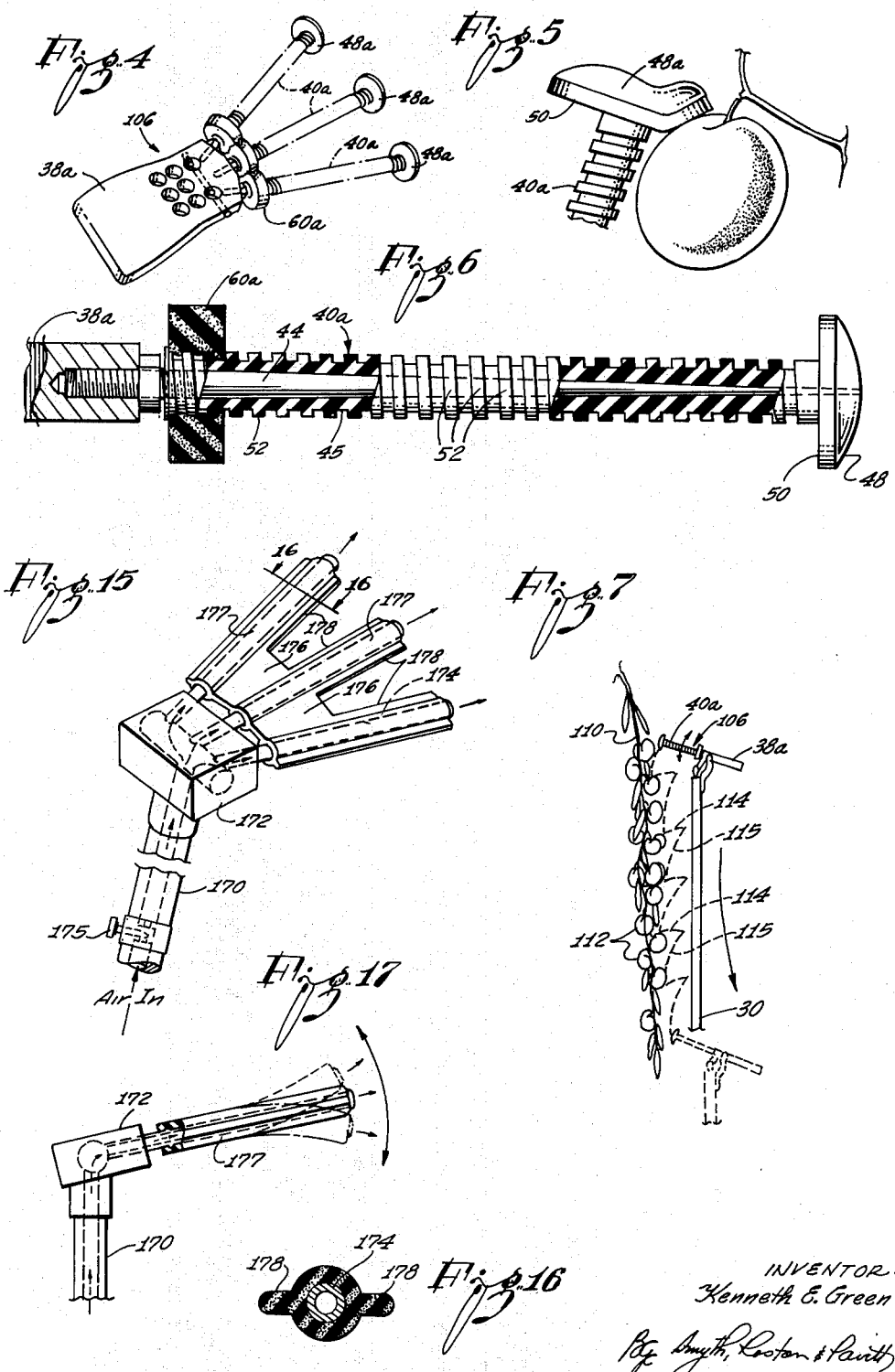

United States Patent Office 3,232,034
Patented Feb. 1, 1966

3,232,034
FRUIT THINNING AND HARVESTING DEVICE
Kenneth E. Green, 521 Wisteria Place,
Santa Ana, Calif.
Filed Sept. 5, 1962, Ser. No. 221,479
7 Claims. (Cl. 56—332)

This invention relates to apparatus for removing fruit from a tree, bush, vine or the like for the purpose of thinning out fruit well in advance of the harvest season or later to pick the ripened fruit.

The broad object of the invention is to avoid the disadvantages of various prior art procedures that will be explained later after the preferred embodiments of the invention are described in detail. In general, the problem is to avoid the damage to trees and fruit that are unavoidable in prior art procedures that are rapid enough to be economical on a commercial scale and at the same time to achieve the selectivity that are offered by slower hand thinning and hand picking procedures.

Broadly described, the various forms of the invention comprise a wand adapted to be held at one end and having a power-actuated oscillating finger assembly at the other end. In some practices of the invention the oscillating finger assembly may comprise a single finger but a finger assembly with at least three fingers is preferred. In most practices of the invention the fingers are relatively rigid mechanically actuated fingers but in some practices of the invention the fingers are flexible elastomeric tubes which are supplied with pressurized fluid, the flexible tubes having discharge ports at their outer ends. These finger tubes react with whipping action to the jet streams that are discharged from their outer ends, the whipping action being effective to dislodge fruit.

The various features and advantages achieved by this basic combination of a wand and power-actuated finger assembly may be understood from the following detailed description and the accompanying drawings.

In the drawings, which are to be regarded as merely illustrative:

FIG. 1 is a side elevational view with parts broken away illustrating a preferred embodiment of the invention for picking ripe fruit;

FIG. 2 is a plan view of the device as seen along the line 2—2 of FIG. 1;

FIG. 3 is a perspective view of a modification of the first embodiment of the invention;

FIG. 4 is a perspective view of a finger assembly adapted for thinning such fruit as peaches;

FIG. 5 is a fragmentary elevational view showing how an end flange of a finger of the finger assembly shown in FIG. 4 engages a fruit to pull the fruit free from a shoot;

FIG. 6 is an enlarged view, partly in side elevation and partly in section, showing the construction of a finger in the finger assembly shown in FIG. 4;

FIG. 7 is a diagrammatic elevational view showing how a downward sweep of the device while the finger assembly is oscillating, results in dislodging fruit at spaced points from a heavily loaded pendant shoot;

FIG. 8 is a diagrammatic plan view of a type of adjustable elevated platform structure on which workmen may stand to dislodge fruit from trees by means of various embodiments of the invention;

FIG. 9 is a side elevational view of the same platform structure;

FIG. 10 is a diagrammatic plan view showing how two of the devices for dislodging fruit from trees may be connected to a common portable compressor;

FIG. 11 is a perspective view showing how a hopper to receive ripe peaches or the like may be attached to an embodiment of the invention adapted for picking fruit;

FIG. 12 is a perspective view of an embodiment of the invention adapted for thinning or harvesting small fruit;

FIG. 13 is a plan view of a finger assembly that may be used for thinning or harvesting small fruit;

FIG. 14 is a fragmentary perspective view of an embodiment of the invention which incorporates fingers in the form of knives for the purpose of thinning grapes;

FIG. 15 is a fragmentary perspective view of an embodiment of the invention which employs flexible tubular fingers which oscillate in reaction to high velocity jet streams discharged from the outer ends of the fingers;

FIG. 16 is a cross section of a finger along the line 16—16 of FIG. 15; and

FIG. 17 is a fragmentary side elevation of the same device.

FIGS. 1–3 show two embodiments of the invention specifically adapted for picking mature fruit in the harvest season and FIGS. 4–8 show an embodiment of the invention specifically adapted for thinning immature fruit in advance of the harvest season for the purpose of obtaining a better quality and yield. All of these embodiments of the invention comprise essentially an elongated support structure in the form of a tubular wand with a suitable finger assembly mounted on an end of the wand, the finger assembly being powered for oscillation in the described manner.

In the first embodiment of the invention for picking fruit illustrated in FIGS. 1 and 2, a tubular wand 30 has an angular bracket 32 at its upper end, the bracket having two ears 34 to receive a pivot bolt 35 on which a finger assembly, generally designated 36, is journalled for oscillation. The length of the tubular wand may vary from a relatively short length of two feet to a longer length of six feet or more. Most of the parts of the device are preferably made of relatively light material, such as aluminum.

The finger assembly 36 may comprise a metal block 38 and at least one finger 40 mounted thereon, the metal block having a transverse pivot bore 42 (FIG. 2) to receive the previously mentioned pivot bolt 35. In the construction shown, the finger assembly has an array of three divergent fingers 40 of approximately 1½ inch diameter, each of which has a relatively rigid core 44 which may be in the form of a hard carbon steel rod approximately seven inches long tapering in diameter from ¼ inch at its base end to ⅛ inch at its outer end. The fingers 40 may be shorter or longer within relatively narrow limits. If the rods are ½ inch shorter, the finger assembly works in a satisfactory manner, but if they are 2 inches shorter the finger assembly does not function as well for its purpose.

Each of the steel cores or rods 44 is encased in an elastomeric inner jacket 45 and an elastomeric outer jacket 46 and carries at its outer end an elastomeric head 48 which forms an end flange 50. The inner jacket 45 is preferably formed with a spiral rib 52 for effective bonding to the outer jacket and this inner jacket may be made of neoprene of 20 Shore hardness. The outer jacket 46 is made of relatively soft sponge rubber or foamed plastic and preferably is formed with an outer sealing skin. The head 48 may be a neoprene button of 12 Shore hardness.

In the construction shown each of the metal rods or cores 44 is further provided with an elastomeric bushing 54 at the base end of the finger in abutment with the inner ends of the two jackets 45 and 46. As may be seen in FIG. 1, each rod or core 44 is provided with a screw thread 55 to thread into a tapped bore 56 of the metal block 38, a lock nut 58 releasably abutting the end of the metal block.

It has been found that an array of divergent fingers of this type tends to catch twigs and leaves in the triangular spaces at the base ends of the fingers. This difficulty is eliminated by mounting on the base ends of the three fingers, respectively, suitable elastomeric collar 60 which impinge on each other and occupy the sharp inner apex regions of the triangular spaces.

As viewed in FIG. 1 the axis of oscillation of the finger assembly 36 as provided by the pivot bolt 35 is spaced laterally to the left of the longitudinal axis of the tubular wand 30 and the finger assembly extends to the right across the longitudinal axis of the wand. The metal block 38 is formed with an integral operating arm 62 that is inclined downward toward the longitudinal axis of the wand 30 and this operating arm is connected by a pivot 64 to a push-pull rod 65, for actuation of the finger assembly.

It may be seen in FIG. 1 that the metal block 38 extends to the left of the pivot bolt 35 to serve as a counterbalance for the three fingers 40. As indicated in FIG. 2 the metal block has a number of bores 66, the metal being removed in this manner to place the center of gravity of the finger assembly substantially at the axis of oscillation for dynamically balancing the finger assembly to minimize the reaction forces on the tubular wand. Obviously the metal block may be formed with a narrowed neck in the region of the bores 66 to avoid the necessity for the bores.

The lower end of the push-pull rod 65 is operated by a fluid motor, generally designated 70, which is of the reciprocating piston type. In this particular embodiment of the invention the fluid motor is a well known type manufactured by Air Speed Tool Company of Los Angeles, California and is designated Speed-Nu-Matic Model R.

Since the fluid motor 70 is a well-known commercial product it need not be described in detail but it may be noted that the motor has a cylinder 72 which is connected to the tubular wand 30 coaxially thereof by means of a coupling 74 in cooperation with a bushing 75 and a lock nut 76. The cylinder 72 has an integral radial projection 78 which provides the fluid inlet for the motor and which houses a control valve having a headed operating plunger 80. The plunger 80 is biased outward to its valve closing position by a suitable coil spring 82. The valve has a tubular adjustment screw with a knurled head 84 which surrounds the plunger 80 and which may be adjusted to vary the maximum rate of flow through the valve when the valve is wide open.

In this first embodiment of the invention a portion of the wand 30 in the region of the cylinder 72 and the coupling 74 serves as a handle and the valve plunger 80 is operated by means of a double-curved leaf spring 85. The leaf spring 85 is mounted on the cylinder projection 78 by suitable screws 86 and overhangs the operating plunger 80 in the manner shown so that when the free end of the leaf spring is flexed laterally towards the handle portion of the wand the leaf spring depresses the operating plunger to release pressurized actuating fluid into the fluid motor. The actuating fluid in this instance is compressed air which is supplied from a suitable source by means of a flexible hose 88, the hose being connected to the cylinder projection 78.

Inside the cylinder 72 a piston rod 90 slidingly extends through a transverse wall 92 that divides the cylinder into two chambers and the piston rod carries two pistons 94 in the two chambers respectively. The cylinder 72 of the fluid motor, not only houses the control valve actuated by the plunger 80 but also houses a concealed valve which alternates to direct the compressed air into the two chambers alternately with resulting reciprocation of the piston rod. The stroke or range of reciprocation of the piston rod 90 may be shortened as desired in a manner that need not be described by advancing an adjustment nut 95 on the lower end of the piston rod, the adjustment nut being normally immobilized by a lock nut 96.

As may be seen in FIG. 1 the finger assembly 36 preferably extends at an obtuse angle relative to the longitudinal axis of the wand 30. The stroke of the piston rod 90 may be varied between one and two inches as desired by manipulating the adjustment nut 95 and it is contemplated that the push-pull rod 65 will be variable in length to vary the average angle of the finger assembly relative to the wand, i.e. to shift the range of oscillation of the finger assembly. For this latter purpose the push-pull rod may be of the construction shown in which the upper end of the push-pull rod has a tapped axial bore 98 to receive the threaded stem of a clevis member 100 which carries the previously mentioned pivot 64. Normally the clevis pin is immobilized against rotation by a lock nut 102. It is apparent that the effective length of the push-pull rod may be changed by temporarily loosening the lock nut 102 and screwing or unscrewing the clevis member 100.

The manner in which the first embodiment of the invention operates may be readily understood from the foregoing description. With the headed operating plunger 80 normally fully extended by the associated coil spring 82, the compressed air source is cut off from the fluid motor 70 and the finger assembly 36 is idle. To cause the finger assembly to oscillate, the operator merely flexes the leaf spring 85 inward for depression of the headed operating plunger 80 whereupon the push-pull rod 65 is reciprocated at a rate which may be increased by further depression of the operating plunger 80 or may be decreased by lessening the depression of the operating plunger. The maximum rate of operation of the fluid motor i.e., the maximum frequency at which the finger member is operated when the operating plunger 80 is fully depressed may be varied by manipulating the knurled head 84 of the previously mentioned tubular adjustment screw to vary the flow capacity of the valve. The range of oscillation of the finger assembly may be varied by simply varying the effective length of the push-pull rod 65 as heretofore mentioned.

The second embodiment of the invention shown in FIG. 3 is largely identical to the first embodiment as indicated by the use of corresponding numerals to indicate corresponding parts. The only change is at the handle end of the wand. The cylinder of the fluid motor 70 in FIG. 3 is formed with a relatively long radial extension which serves as a radial handle 104 and a supply hose 88a is connected to the outer end of the handle. The inner end of the handle 104 houses the previously mentioned control valve operated by the previously described operating plunger 80 and regulated by the previously described tubular screw having the knurled head 84. The headed plunger 80 is operated directly by finger pressure instead of indirectly by a curved leaf spring.

The third embodiment of the invention shown in FIGS. 4–7 differs from the first embodiment shown in FIG. 1 solely in the character of a finger assembly 106 that is mounted at the outer end of the wand 30. This finger assembly 106 is designed specifically to thin fruit in advance of the harvest season as distinguished from the picking of fruit in the harvest season. Except for the fingers 40a the finger assembly 106 is of the previously described construction and is operatively connected to a push-pull rod 65 in the previously described manner.

The fingers 40a are similar to the previously described fingers 40 but are not equipped with the previously described outer foamed elastomer jackets 46. Thus the peripheral surface of each of the fingers 40a is the surface of the previously described jacket 45 with its spiral peripheral rib 52. Since the fingers 40a are much more slender than the previously described fingers 40 the base ends of the fingers are closer together and the fingers diverge at lesser angles. The base ends of the fingers are provided with suitably elastomeric collars 60a which serve the same purpose as the previously mentioned collars 60.

A workman of ordinary skill quickly becomes expert in the operation of a device of the character described for dislodging fruit. The end flange 50 of the head or enlargement 48 at the outer end of a finger functions to engage the body of a fruit in the manner indicated in FIG. 5 and thus by virtue of the oscillation of the finger pulls the fruit free from the tree. Relatively ripe fruit, of course, pulls free more readily than immature fruit and ripe fruit is more susceptible to damage by bruising and cuts than immature fruit. The soft outer jackets 46 of the fingers assembly in the embodiment of the invention shown in FIGS. 1, 2 and 3 avoid damage to the fruit and the radial flanges 50 at the outer ends of the fingers are effective for dislodging ripe fruit without bruising the fruit.

The immature fruit that is thinned by the embodiment of the invention shown in FIGS. 4–7 is less susceptible to damage by impact and the inner jacket 45 alone is sufficiently resilient to avoid damaging immature fruit. The spiral rib 52 of the jacket 45 is highly effective for frictional engagement with the immature fruit. It will be noted in FIGS. 5 and 6 that with the outer jacket 46 omitted the radial extent of the end flange 50 of each finger is increased. Since immature fruit resists dislodgement to greater extent than mature fruit, the increased radial dimension of the end flanges 50 is desirable.

FIG. 7 illustrates the highly effective manner in which the fruit thinning device may be applied to a so-called hanger, i.e. a pendant branch 110 loaded with numerous fruit bodies 112 throughout its length. If the operator draws the wand 30 downward in one sweeping movement from the upper position shown in solid lines to the lower position indicated by broken lines while the finger assembly 106 is oscillating, the outer ends of the fingers carrying the elastomeric heads 48 will follow the somewhat zig-zag path indicated by the dotted line. The laterally extending portions 114 of this zig-zag pat occur when the finger assembly 106 is swinging upward while the wand is moving downward and the alternate downwardly extending acurate portions 115 of the zig-zag path occur when the finger assembly is swinging downward simultaneously with the downward translation of the wand 30.

The dotted line in FIG. 7 is to be understood as merely indicating the general character of the downward path of the outer ends of the fingers 40a since the path is a composite of the oscillation of the finger assembly and the downward translation of the wand and the finger assembly may be oscillated at various frequencies at various times and the wand may be translated downwardly at various rates. In practice it has been found that in thinning peaches a frequency of oscillation on the order of 300 to 400 per minute is satisfactory on the part of the finger assembly and with such a frequency an operator soon learns how fast to move the wand downward to produce the desired thinning.

The important advantage of this mode of operation of the device characterized by the zig-zag path is that the device inherently operates to skip some of the fruit in the manner desired for the purpose of thinning the fruit. Thus the fingers alternately retract from the fruit at a point longitudinally of the branch 110 and then advance into the fruit at another point spaced longitudinally from the first point. The distance apart of these points at which the finger assembly effectively enters the region of the immature fruit may be readily varied as required by varying the frequency of oscillation of the finger assembly and/or varying the rapidity of the downward sweeping movement. If an insufficient number of the fruit on the pendant branch is removed by a single downward sweep of the device, the operator merely repeats the sweep. In the thinning of peaches, it is usually desirable to leave spaces of 4 to 6 inches between the peaches.

Since the wand is relatively light it may be maneuvered rapidly to thin the fruit on a tree in a highly expeditious manner. One procedure that may be followed is for two men to work on two trees simultaneously using eight foot ladders and the described devices with wands of 2 feet to 3 feet long. In another procedure one man on the ground employs a 6-foot wand and another man on an elevated platform works simultaneously with a shorter wand of 2 feet to 3 feet long.

A highly maneuverable platform device that may be employed for this purpose illustrated by FIGS. 8 and 9 is what is known as a Quadraman manufactured by Merk-O Manufacturing in Fresno, California. This device which is mounted on wheels 116 for maneuver by a tractor has a base structure 120 which carries a central platform 122 capable of being raised and lowered hydraulically. For this purpose the central platform 122 is supported by a series of telescoping hydraulic cylinders 124 which may be extended and retracted as desired by manipulation of an upwardly extending control rod 125. Mounted on each of the four corners of the central platform 122 to swing laterally in horizontal arcs are four auxiliary platforms 126 on which operators can stand.

The angular position of each auxiliary platform is controlled by a hydraulic cylinder 128 which is controlled by manipulation of a corresponding angular arm 130. Thus all four of the auxiliary platforms 126 may be elevated simultaneously by manipulation of the central upright control rod 125 and each of the four auxiliary platforms 126 may be individually swung laterally by manipulation of the corresponding angular arm 130. With four men on the four auxiliary platforms 126 and four men on the ground the crew of eight men can thin the fruit of trees two at a time in a rapid manner or only two men on two of the auxiliary platforms may form a team with two men on the ground to thin the fruit of the trees of an orchard two at a time.

FIG. 10 shows a compressor 132 which includes a prime mover in the form of a small gasoline engine and which supplies compressed air through two hoses 134 to two wands 135, that are equipped with finger assemblies 136. The compressor 132 is portable, being light enough for two men to pick up and carry, but to facilitate movement is mounted on ground wheels 138 and is equipped with a handle 140 by means of which it may be pulled from one location in the orchard to another. With the two hoses 134 of ample length, for example 30 feet each, and with the wands 135 of ample length, for example 6 feet, two men 142 may work as a team to cover two rows of trees in one traverse of an orchard.

FIG. 11 shows how a wand 144 of suitable length, for example 6 feet, may be equipped with a previously described finger assembly 36 for picking fruit such as peaches. A hopper 145 is attached to the wand 144 in the manner shown to catch the falling fruit that is dislodged by the finger assembly. The hopper 145 comprises a funnel made of heavy flexible nylon mesh with the rim of the funnel reinforced by a metal ring 146. The hopper is continuous with a flexible duct 147 of the same mesh material which is connected to the hopper to guide the falling fruit to a lower level, for example to guide the fruit to a collection box 150. The interior of the duct 147 is equipped with elastic baffles in the form of transverse ribbons 152 of elastic material that extend partially across the interior of the duct and serve to retard the fall of the fruit that passes through the duct. Preferably, the duct is reinforced by a spiral wire 154.

A fruit thinning device of the character shown in FIGS. 4, 5, and 6 having the fruit-thinning finger assembly 106 is fully effective for thinning fruit at any stage from the is only a few weeks from maturity. An important featime the trees are in blossom to the time that the fruit ture of the invention is that an operator quickly learns to use the device selectively. It is a simple matter to maneuver the wand in such manner that one of the two outer fingers 40a or one of the two outer fingers in cooperation with the central finger, dislodges a selected fruit from a branch. Thus the device may be used either as shown in FIG. 7 for the random thinning of fruit from a heavily laden branch or may be used to single out individual fruit for dislodgment.

The operator may oscillate the finger assembly continuously or may operate the finger assembly intermittently or, if desired, may only lightly depress the operating plunger 80 to cause only one or two oscillations of the finger assembly. The rate of oscillation, whether continuous or intermittent may be controlled by simply varying the degree to which the operating plunger 80 is depressed. Usually it is desirable to manipulate the knurled head 84 of the adjustment screw so that a desired rate of air inflow into the fluid motor is predetermined when the operating plunger 80 is fully depressed. In this manner the device may be adapted to operate at a particular frequency desired for dislodging a particular kind of fruit under particular circumstances. For example, it is well known that in the early morning when it is relatively cool, immature fruit may be dislodged with less resistance than later in the day. Accordingly the knurled head of the adjustment screw may be set to cut down the air flow to the fluid motor in the morning and may be reset to admit greater inflow later in the day. The same object may be accomplished by regulating the compressor to deliver compressed air at 25 to 30 p.s.i. in the morning and to deliver the compressed air at 45 p.s.i. later in the day.

The advantages of the invention may be appreciated when the disadvantages of prior procedures are considered. Heretofore, it has been common practice to shake the limbs of a tree to cause the fruit to drop from the tree onto a catching apron positioned under the tree. For this purpose, devices have been developed to grip a tree trunk with enough power to shake the whole tree to cause a desired portion or all of the fruit to fall in one operation.

One disadvantage of this procedure is that too often the violent action against the tree trunk damages the bark with serious consequences. Another disadvantage is that in an orchard where the soil is moist to substantial depths, the power-driven oscillation of the tree trunk is transmitted to the roots with resulting root damage, especially in a heavily irrigated orchard. When this procedure is used to thin fruit, it has the further drawback of leaving the fruit poorly distributed, the remaining fruit being in bunches. A further disadvantage in the harvesting of mature fruit is that 10 to 20 percent of the falling fruit is damaged by striking branches before they reach the collection apron. Such a percentage of damage causes a canning company to downgrade the lot.

To avoid these defects, attempts have been made to dislodge fruit by a flailing operation. For example, one apparatus of this type for thinning fruit employs a plurality of relatively long upwardly extending rods which are pivotally mounted at their lower end and are oscillated in unison through short arcs by suitable power means. To achieve a whipping action, a short upper end section of each metal rod is connected to the remaining main section by a coil spring which flexes easily.

One disadvantage of this flailing apparatus is that the paths of oscillation of the upright rods are fixed relative to each other with intervening zones of relatively great width where no flailing action whatsoever occurs. Another disadvantage is that the flexibly connected upper end sections are made of metal and because of their weight develop high angular momentum with consequent damage to the fruit even when the metal end sections are covered with rubber. Because of the high impact forces, such a flailing apparatus would damage ripe fruit too severely for the fruit to be used.

Another common procedure for thinning fruit such as peaches has been to use simple sticks that strike the fruit sidewise, the fruit at the lower levels being thinned by an operator standing on the ground with a stick 4 to 6 feet long and the upper levels being processed by an operator on a ladder or on a portable adjustable elevated platform. Such a procedure is unsatisfactory, however, because the thinning sticks dislodge too many leaves, break off some shoots, and bruise other shoots, the bruising of the shoots reducing the crop for the subsequent season. A thinning stick is unsatisfactory for the further reason that too often instead of dislodging an immature peach, it merely loosens the peach to cause the peach to remain on the tree with no possibility of ripening.

Thinning the fruit on a tree, for example, a peach tree, may also be carried out early by knocking off a percentage of the blossoms, a procedure known as blossom thinning; or thinning may be accomplished by removing embryo fruit that develop soon after blossom time, a procedure known as pre-thinning; or thinning may consist in removing fruit at index time or at any time before or after reference time. For most varieties of peaches, reference time occurs about seven weeks before the peaches ripen and is a period of about one week during which peaches stop growing while their pits harden.

Thinning sticks are commonly employed for blossom thinning and pre-thinning with all of the disadvantages heretofore mentioned. Attempts have been made to avoid these disadvantages by using chemicals to destroy a percentage of the blossoms but too often all of the blossoms are killed. Other attempts have been to use strong sprays or jets of water to thin blossoms but none of these procedures has been satisfactory.

The most satisfactory results have been obtained by simple hand thinning because hand thinning is highly selective and causes only minimum damage to the fruit. A workman can speed up hand thinning in various ways, for example, by raking a heavily laden pendant shoot with his fingers, but at best the process is so slow as to be too costly for commercial practice.

FIGS. 12–15 show forms of the invention especially adapted for the thinning or harvesting of small fruit such as berries and grapes. Each of these embodiments of the invention comprises a wand 30 of the previously described construction with a special finger assembly mounted on the wand.

In FIG. 12 the finger assembly comprises a block 160 of suitable material which serves not only as a counter weight, but also as a base for a set of fingers 162 in the form of stiff wires of relatively short length, for example, of a length of 2½ inches.

In FIG. 13 a similar block 160a carries a set of fingers 164 which are of a construction similar to that of the previously described fruit thinning fingers 40a of FIGS. 4, 5 and 6 but which are reduced in scale, being only two to three inches in length.

In FIG. 14 a similar block 160b carries a set of three fingers 165 in the form of short curved knives which may be approximately two inches long. The use of knives instead of fingers is especially advantageous for thinning clusters of grapes.

The form of the invention shown in FIGS. 15, 16, and 17 comprises a tubular shank 170 with a manifold block 172 rigidly mounted on the upper end of the shank, the block carrying a set of fingers in the form of tubes 174 that are made of flexible elastomeric material to give the finger tubes freedom to flex or whip. In the construction shown, the lower or base end of the tubular shank 170 is provided with a manually operable valve 175 and connected to an air compressor for delivery of compressed air to the manifold block 172.

The three finger tubes 174 are interconnected near their convergent base ends by webs 176 of a soft elastomeric material such as neoprene and the material of the webs is extended to form jackets 177 on the finger tubes 174 and to form radial flanges 178 along the length of the respective finger tubes, the radial flanges being in the same plane as the webs 176. The outer ends of the finger tubes 174 are open to serve as discharge ports and may be somewhat restricted if desired for acceleration of the resultant discharge streams of air. The finger tubes 174 react to the discharge jets by tending to whip in random directions but the webs 176 and the flanges 178 cause the flexing and whipping action to occur in planes that are substantially perpendicular to the web and the flanges. The webs 176 also serve to prevent twigs and branches from being wedged between the base ends of the fingers.

My description in specific detail of the selected practices of the invention will suggest various changes, substitutions and other departures from my disclosure within the spirit and scope of the appended claims.

I claim:

1. A power tool for dislodging fruit from a tree or the like, comprising:
   a hollow support structure adapted to be manually held at one end with the other end extending to the region of the fruit that is to be dislodged;
   a finger assembly pivotally mounted on said other end of the hollow support structure, the length of the finger assembly being substantially less than half the length of the support structure;
   a push-pull rod inside the hollow support structure extending longitudinally thereof and operatively connected to the finger assembly;
   actuating means mounted on said one end of the hollow support structure to reciprocate said rod; and
   counter-balancing means included in said finger assembly to dynamically balance the finger assembly with respect to its pivot axis.

2. A power tool for dislodging fruit from a tree or the like, comprising:
   an elongated support structure adapted to be manually held at one end with the other end extending to the region of the fruit that is to be dislodged;
   a finger assembly including at least one finger mounted on said other end of the support structure, said finger comprising a stiff longitudinal core encased in elastomeric material, said finger has an elastomeric enlargement on the outer end thereof to engage the fruit; and
   means to transmit energy from said one end of the support structure to said other end of the support structure to oscillate said finger assembly.

3. A power-actuated tool for dislodging fruit from a tree or the like, comprising:
   a hollow support structure adapted to be manually held at one end with the other end extending to the region of the fruit that is to be dislodged;
   pivot means on the outer end of said support structure;
   a finger assembly pivotally mounted on the pivot means, the pivot axis of the pivot means being to one side of the axis of the support structure with the finger assembly extending therefrom across the axis of the support structure to the other side of the support structure at an obuse angle to the longitudinal axis of the support structure;
   an operating arm rigidly connected to said finger assembly near the pivot axis and extending toward the longitudinal axis of the support structure;
   a push-pull rod inside the hollow support structure longitudinally thereof and connected to said operating arm; and
   power means at said one end of the support structure connected to said push-pull rod for reciprocation thereof.

4. A combination as set forth in claim 3 which includes a counterweight in said finger assembly extending to the side of said pivot axis.

5. A power tool for dislodging fruit from a tree or the like, comprising:
   an elongated support structure adapted to be manually held at one end with the other end extending to the region of the fruit that is to be dislodged;
   an array of divergent fingers mounted on the other end of the support structure;
   means to transmit energy from said one end of the support structure to said other end thereof to oscillate the outer ends of said fingers; and
   means occupying the convergent spaces between the fingers at the base ends of the fingers to keep twigs from becoming wedged between the fingers.

6. A power tool for dislodging fruit from a tree or the like, comprising:
   an elongated support structure adapted to be manually held at one end with the other end extending to the region of the fruit that is to be dislodged;
   an array of fingers mouned on the other end of said support structure, each of said fingers comprising a hard core with a soft elastomeric covering, said fingers have elastomeric enlargements at their outer ends to engage the fruit; and
   power means to oscillate said fingers.

7. A power tool for dislodging fruit from a tree or the like, comprising:
   an elongated support structure adapted to be manually held at one end with the other end extending to the region of the fruit that is to be dislodged;
   an array of fingers mounted on the other end of said support structure, each of said fingers comprising a hard core with a soft elastomeric covering;
   means spanning the spaces between the fingers at the base ends thereof to keep twigs from being wedged between the fingers; and
   power means to oscillate said fingers.

References Cited by the Examiner

UNITED STATES PATENTS

| | | | |
|---|---|---|---|
| 291,792 | 1/1884 | Smith | 56—333 |
| 406,744 | 7/1889 | Kriner | 56—332 |
| 564,881 | 7/1896 | Gould | 56—340 |
| 818,342 | 4/1906 | Bell | 56—333 |
| 1,069,849 | 8/1913 | Byrne | 56—340 |
| 1,146,052 | 7/1915 | Crocker | 56—333 |
| 1,300,168 | 4/1919 | Hoeber | 56—332 |
| 1,783,430 | 12/1930 | Johnson | 47—58 |
| 2,660,003 | 11/1953 | Farley | 47—58 |
| 2,772,514 | 12/1956 | Mangnall | 56—328 X |
| 2,990,669 | 7/1961 | Klemm | 56—334 |
| 3,077,720 | 2/1963 | Grore | 56—328 |

ABRAHAM G. STONE, *Primary Examiner.*

RUSSELL A. KINSEY, *Examiner.*